(12) United States Patent
Saleh et al.

(10) Patent No.: US 8,219,386 B2
(45) Date of Patent: Jul. 10, 2012

(54) ARABIC POETRY METER IDENTIFICATION SYSTEM AND METHOD

(75) Inventors: Al-Zahrani Abdul Kareem Saleh, Dhahran (SA); Moustafa Elshafei, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 838 days.

(21) Appl. No.: 12/320,196

(22) Filed: Jan. 21, 2009

(65) Prior Publication Data

US 2010/0185436 A1 Jul. 22, 2010

(51) Int. Cl.
| | |
|---|---|
| G06F 17/27 | (2006.01) |
| G06F 17/20 | (2006.01) |
| G06F 17/21 | (2006.01) |
| G06F 17/28 | (2006.01) |
| G10L 15/06 | (2006.01) |
| G09B 19/04 | (2006.01) |
| G09B 19/00 | (2006.01) |
| G10L 11/00 | (2006.01) |

(52) U.S. Cl. ......... 704/9; 704/1; 704/6; 704/7; 704/236; 704/245; 704/276; 434/156; 434/167

(58) Field of Classification Search ............... 704/1–10, 704/231–257, 276, E15.001–E15.05, E11.001–E11.007; 434/112–118, 128–129, 156–185, 245, 308–321, 434/364, 433
See application file for complete search history.

(56) References Cited

U.S. PATENT DOCUMENTS

| | | | |
|---|---|---|---|
| 3,940,565 A | 2/1976 | Lindenberg | |
| 4,490,840 A * | 12/1984 | Jones | ............ 704/276 |
| 5,111,398 A * | 5/1992 | Nunberg et al. | ............ 704/9 |
| 5,555,344 A | 9/1996 | Zunkler | |
| 5,708,759 A | 1/1998 | Kemeny | |
| 5,742,928 A | 4/1998 | Suzuki | |
| 5,993,218 A * | 11/1999 | Kapell | ............ 434/168 |
| 6,029,131 A * | 2/2000 | Bruckert | ............ 704/260 |
| 6,056,552 A * | 5/2000 | Al-Housseini | ............ 434/185 |

(Continued)

FOREIGN PATENT DOCUMENTS

JP 11219195 8/1999

OTHER PUBLICATIONS

"Arabic poetry." al-bab.com: Published Sep. 26, 2006. Accessed Jan. 10, 2011, via Internet Archive to published version of Feb. 6, 2007. <http://www.al-bab.com/arab/literature/poetry.htm>.*

(Continued)

*Primary Examiner* — Pierre-Louis Desir
*Assistant Examiner* — David Kovacek
(74) *Attorney, Agent, or Firm* — Richard C. Litman

(57) ABSTRACT

The Arabic poetry meter identification system and method produces coded Al-Khalyli transcriptions of Arabic poetry. The meters (Wazn, Awzan being forms of the Arabic poems units Bayt, Abyate) are identified. A spoken or written poem is accepted as input. A coded transcription of the poetry pattern forms is produced from input processing. The system identifies and distinguishes between proper spoken poetic meter and improper poetic meter. Error in the poem meters (Bahr, Buhur) and the ending rhyme pattern, "Qafiya" are detected and verified. The system accepts user selection of a desired poem meter and then interactively aids the user in the composition of poetry in the selected meter, suggesting alternative words and word groups that follow the desired poem pattern and dactyl components. The system can be in a stand-alone device or integrated with other computing devices.

20 Claims, 6 Drawing Sheets

U.S. PATENT DOCUMENTS

| | | | |
|---|---|---|---|
| 6,081,774 A * | 6/2000 | de Hita et al. | 704/9 |
| 6,084,168 A * | 7/2000 | Sitrick | 84/477 R |
| 6,173,262 B1 * | 1/2001 | Hirschberg | 704/260 |
| 6,230,126 B1 | 5/2001 | Kuroda | |
| 6,233,545 B1 * | 5/2001 | Datig | 704/2 |
| 6,275,789 B1 * | 8/2001 | Moser et al. | 704/7 |
| 6,408,266 B1 * | 6/2002 | Oon | 704/1 |
| 6,438,515 B1 * | 8/2002 | Crawford et al. | 704/5 |
| 6,859,211 B2 * | 2/2005 | Friedlander | 715/700 |
| 6,996,527 B2 | 2/2006 | Boman et al. | |
| 7,155,390 B2 | 12/2006 | Fukada | |
| 7,184,949 B2 | 2/2007 | Kurzweil et al. | |
| RE40,731 E * | 6/2009 | Bookman et al. | 1/1 |
| 7,612,278 B2 * | 11/2009 | Sitrick et al. | 84/609 |
| 7,717,712 B2 * | 5/2010 | Brun et al. | 434/156 |
| 7,840,608 B2 * | 11/2010 | Kurzweil et al. | 707/804 |
| 2002/0038597 A1 * | 4/2002 | Huopaniemi et al. | 84/609 |
| 2004/0072136 A1 * | 4/2004 | Roschelle et al. | 434/350 |
| 2004/0179043 A1 * | 9/2004 | Viellescaze et al. | 345/861 |
| 2006/0069561 A1 | 3/2006 | Beattie et al. | |
| 2006/0074659 A1 | 4/2006 | Adams et al. | |
| 2006/0132714 A1 * | 6/2006 | Nease et al. | 352/244 |
| 2007/0055514 A1 | 3/2007 | Beattie et al. | |
| 2007/0193435 A1 * | 8/2007 | Hardesty et al. | 84/609 |
| 2007/0282592 A1 * | 12/2007 | Huang et al. | 704/9 |
| 2008/0140413 A1 * | 6/2008 | Millman et al. | 704/270 |
| 2008/0190272 A1 * | 8/2008 | Taub et al. | 84/645 |
| 2009/0048843 A1 * | 2/2009 | Nitisaroj et al. | 704/260 |
| 2009/0164394 A1 * | 6/2009 | Multerer et al. | 706/12 |
| 2010/0185436 A1 * | 7/2010 | Saleh et al. | 704/9 |

OTHER PUBLICATIONS

"Classical Definition of Ghazal." South Asian Women's Form: Nov. 13, 2000. Accessed Jan. 11, 2011, via Internet Archive to published version of Nov. 30, 2001. <http://www.sawf.org/newedit/edit11272000/musicarts.asp>.*

Cohen, P.S. and W. Zadrozny. "Method for Automatic Analysis of Meter in (Both) Poetry and Prose." IBM Technical Disclosure Bulletin. vol. 32, No. 9B. Feb. 1990.*

Park, alex S. And James R. Glass. "Unsupervised Pattern Discovery in Speech." IEEE Transcations on Audio, Speech, and Language Processing. vol. 16, No. 1, Jan. 2008. Copyright 2007.*

* cited by examiner

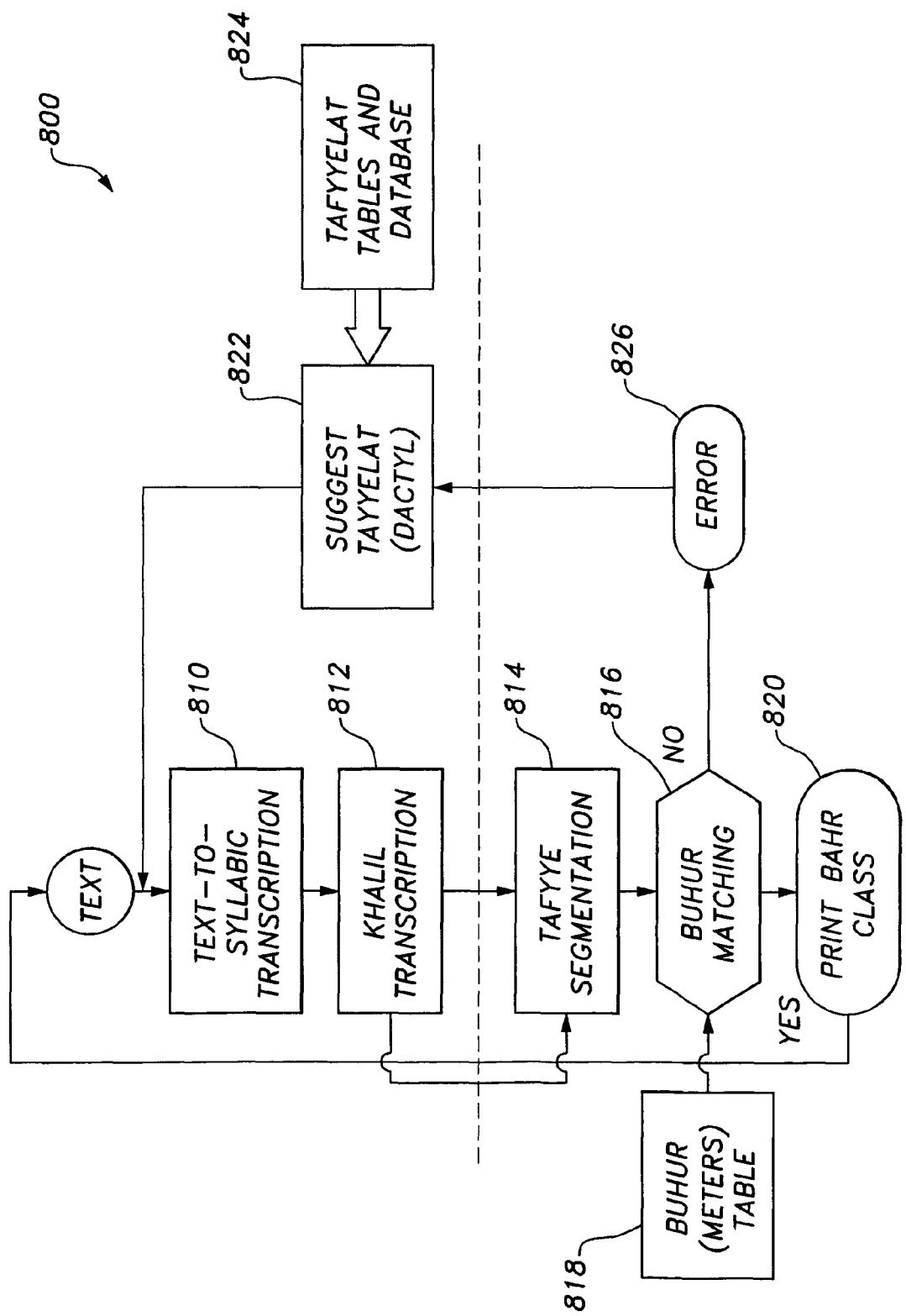

ARABIC POETRY METER IDENTIFICATION SYSTEM AND METHOD

BACKGROUND OF THE INVENTION

1. Field of the Invention

The present invention relates to dedicated electronic devices and/or general purpose computerized systems for analyzing linguistic patterns, and particularly to an Arabic poetry meter identification system and method that identifies the Wazn and Awzan meter forms of the Bayt and Abyate Arabic poems units.

2. Description of the Related Art

Arabic is very different from the Indo-European languages in its letterforms, grammatical structure and sounds. Poetry played a special role in the Arabic culture and its literature. Poetry is freely quoted in homes, palaces, bazaars in the context of speeches, jokes, and the like. Classical Arabic poetry is very structured and quantitative.

Classical Arabic poetry follows strict rhyme forms called Meters (wazn, awzaan). Meters are based on the syllabic structure, rather than stress. A short syllable is a consonant followed by a short vowel. A long syllable is a voweled letter followed by either an unvoweled consonant or a long vowel. A nunation sign (an N sound) at the end of a word also makes the final syllable long. A classical Arabic poem follows one of sixteen or seventeen meters called poem's "sea" (Bahr, Bhour). Each one of these meters consists of a specific sequence of dactyls (Tafeyyla).

The meters normally used in Arabic poetry were first codified in the 8th century by Al-Khalil bin Ahmad and have changed little since. However, there was already sufficient flexibility in the existing meters to allow subsequent practitioners a good deal of innovation.

Each line of a poem is one unit or verse, and is called "Bayt". A verse or couplet consists of two approximately equal and parallel parts in the same meter. Each half is called (Shatr; Shatrayn). The number of verses in a particular poem depends on the type of poem being composed, but seldom (at the period we are considering) exceeds one hundred. Below is an example of a commonly found meter, called "Taweel" in Arabic poetry, showing long (O—) and short (—) syllables. They represent pairs of half-lines and should be read from right to left. The patterns are not rigidly followed. Two short syllables may be substituted for a long one, and vice versa.

The Khalili transcription of the "Taweel" poem meter is shown below:

|O—O—O——|O—O——|     |O—O—O——|O—O——|

The ending rhyme (Qafiya), a common rhyme at the end of each poem line, is basically determined by the last consonant of a word. The ending rhyme also follows specific patterns and should be consistent throughout the poem. In rhyme-words, Nunation (the sound of the N phoneme) is dropped, as (sometimes) is the final vowel. Because short vowels are generally considered long when they occur at the end of a line, the vowels that appear short in their written form also rhyme with their corresponding long vowels. For this reason, it is the pronunciation, not the writing, that counts.

The letters are grouped in specific sequences called "Asoul". A byte consists of two halves based on specific dactyl pattern forms from these Asouls. Short voweled letters (mutaharrek) are represented by (—). Arabic has three forms of vowel, which are known as Dhammah, /u/; Fathah, /a/; and Kasrah, /i/; however, in poetry meters, all of them are considered having one standard time frame. The unvoweled consonant letter is symbolized by (O).

Dactyls are the partitioning of words according to the meters (Wazn). They consist of the following forms: (a) one short voweled letter (Harf) followed by an unvoweled letter; (b) two short voweled letters followed by an unvoweled letter (O—); and (c) three short voweled letters followed by an unvoweled letter (O—).

The dactyls are grouped into known sets of metawords or forms called Tafeyyla.

There are seventeen types of traditional poetry meters. Dactyls come under two forms. The first one carries five consonant letters, starting with two voweled ones followed by a consonant, then a voweled consonant again before it finishes with a consonant (as in O——O———). However, the second form has seven letters, starting with one voweled consonant followed by one unvoweled consonant, then a voweled consonant, then a consonant, then two voweled consonants, and closed with a consonant. To avoid confusion in the sequel, we will refer to both poem dactyls and their Tafeyyla as "dactyls".

An electronic or computerized system and method for identifying Arabic poetry meter is desirable. Thus, an Arabic poetry meter identification system and method solving the aforementioned problems is desired.

SUMMARY OF THE INVENTION

The Arabic poetry meter identification system and method is an electronic or computerized system that produces coded Al-Khalyli transcriptions of Arabic poetry. The meters (Wazn, Awzan being forms of the Arabic poems units Bayt, Abyate) are identified. A spoken or written poem is accepted as input. A coded transcription of the poetry pattern forms is produced from input processing. The system identifies and distinguishes between proper spoken poetic meter and improper poetic meter. Errors in the poem meters (Bahr, Buhur) and the ending rhyme pattern, "Qafiya," are detected and verified. The system accepts user selection of a desired poem meter and then interactively aids the user in the composition of poetry in the selected meter, suggesting alternative words and word groups that follow the desired poem pattern and dactyl components. The system can be in a stand-alone device or integrated with other computing devices.

The system performs, for any line of Arabic poetry, an automatic recognition of the meter used. It produces a transcription that contains the syllabic decomposition for each hemistich of each line, as well as its metrical analysis. Errors due to the metrical scanning or to the editing of poems can be located automatically. Moreover, it allows a computerized search for formulae, word sequence of a particular dactyl pattern, and provides guidance to novel poets in balancing out their constructed poem.

The system and method may be embodied or carried out in a dedicated electronic device having a dedicated processor, or in a general-purpose computerized system.

These and other features of the present invention will become readily apparent upon further review of the following specification and drawings.

BRIEF DESCRIPTION OF THE DRAWINGS

FIG. 8 is a flowchart showing the main processing steps in the learning mode in an Arabic poetry meter identification system and method according to the present invention.

Similar reference characters denote corresponding features consistently throughout the attached drawings.

DETAILED DESCRIPTION OF THE PREFERRED EMBODIMENTS

Figure 1:
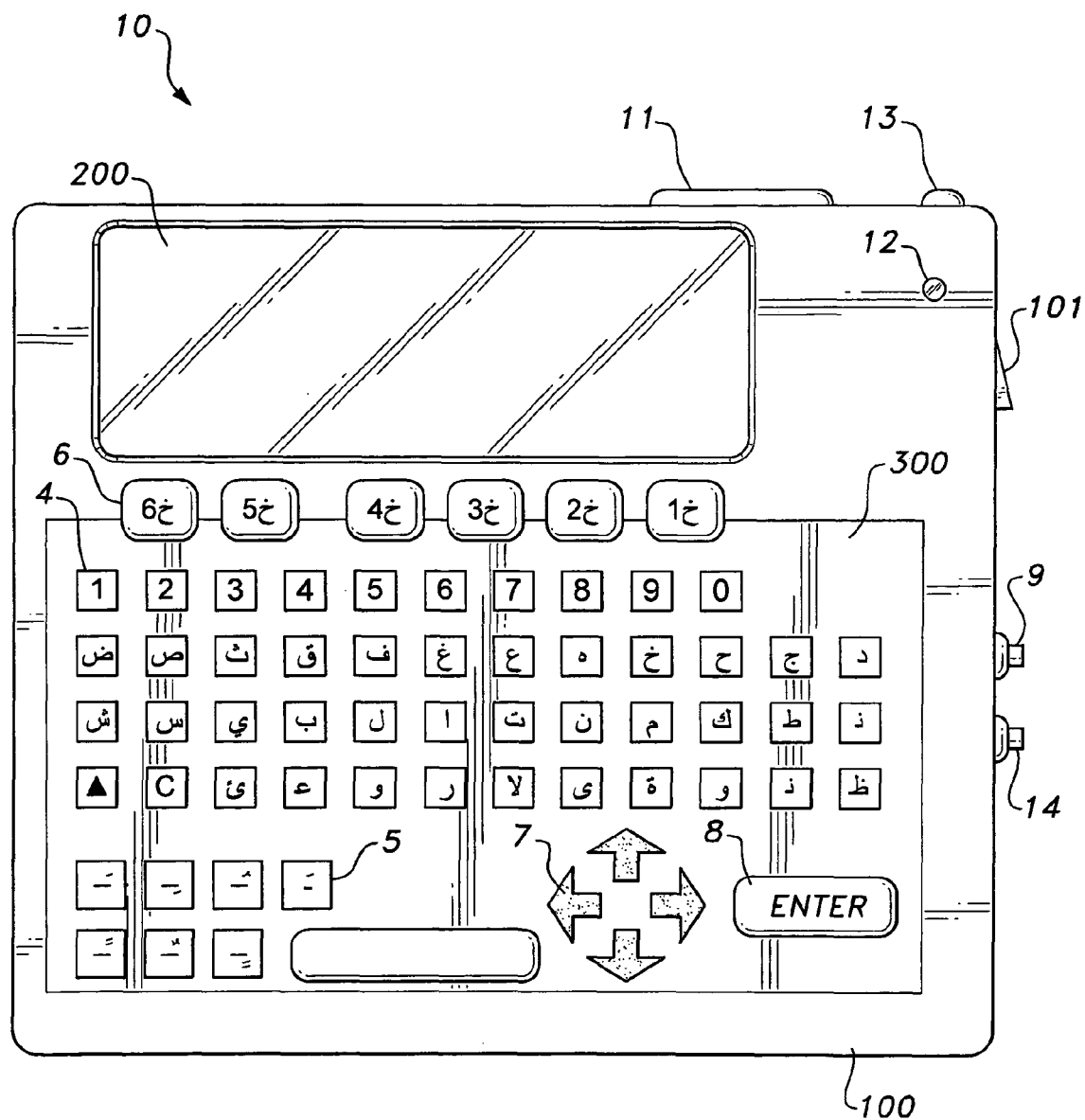
FIG. 1 is a front view of an exemplary dedicated electronic device for carrying out an Arabic poetry meter identification method according to the present invention.

The Arabic poetry meter identification system and method may be embodied or carried out in a dedicated electronic device having a dedicated processor, or in a general purpose computerized system having hardware and software components adapted for implementing the system and method. FIG. 1 shows an exemplary dedicated electronic device 10 having a display, a keyboard, and a voice input signal connection. The system operates in three modes: the voice analysis mode, the text analysis mode, and the learning mode. The device 10 includes a processor, which may be a microprocessor, microcontroller, digital signature processor, application specific integrated circuit (ASIC), or other electronic processor, and associated memory for storage and execution of the operating procedure. The device 10 is intended to be used as stand-alone unit in educational classes or for personal use, or can be integrated with audio equipment or computational equipment.

As shown in FIG. 1, the device 10 may include an LCD display 200 and a keyboard 300, or other suitable monitor and input devices. The keyboard 300 includes an Arabic keyboard 400, diacritical keys 5 for inserting Arabic diacritical marks, four direction keys 7 for display menu selection, and menu selection keys 6. The device 10 may be connected to an external power adapter via a power connector 13. The digital connector 11 provides optional connectivity of the device to other computing equipment and peripherals. The device has also an audio input 9, and audio output 14 for connection to microphone/headphones or other audio or computer equipment. Switch 101 is provided for turning the device 10 on or off, while an LED power-on indicator 12 is disposed on a highly visible portion of the device 10. Power-on to the device 10 defaults the device 10 to a voice analysis mode. However, the user can change the default operating mode from a menu displayed on LCD display 200. Arrows 7 can scroll up, down, left, and right through items displayed on screen 200. When appropriate data has been selected and/or keyed in, the user can press the enter button 8 to confirm the selection/key strokes to the device 10.

In the voice analysis mode, the device 10 waits for the user to start voice input through a microphone, electronic storage media (CD or DVD), or other audio input source. The device 10 records and processes the data while segmenting the input audio into a sequence of basic sound signal classes.

Figure 2:
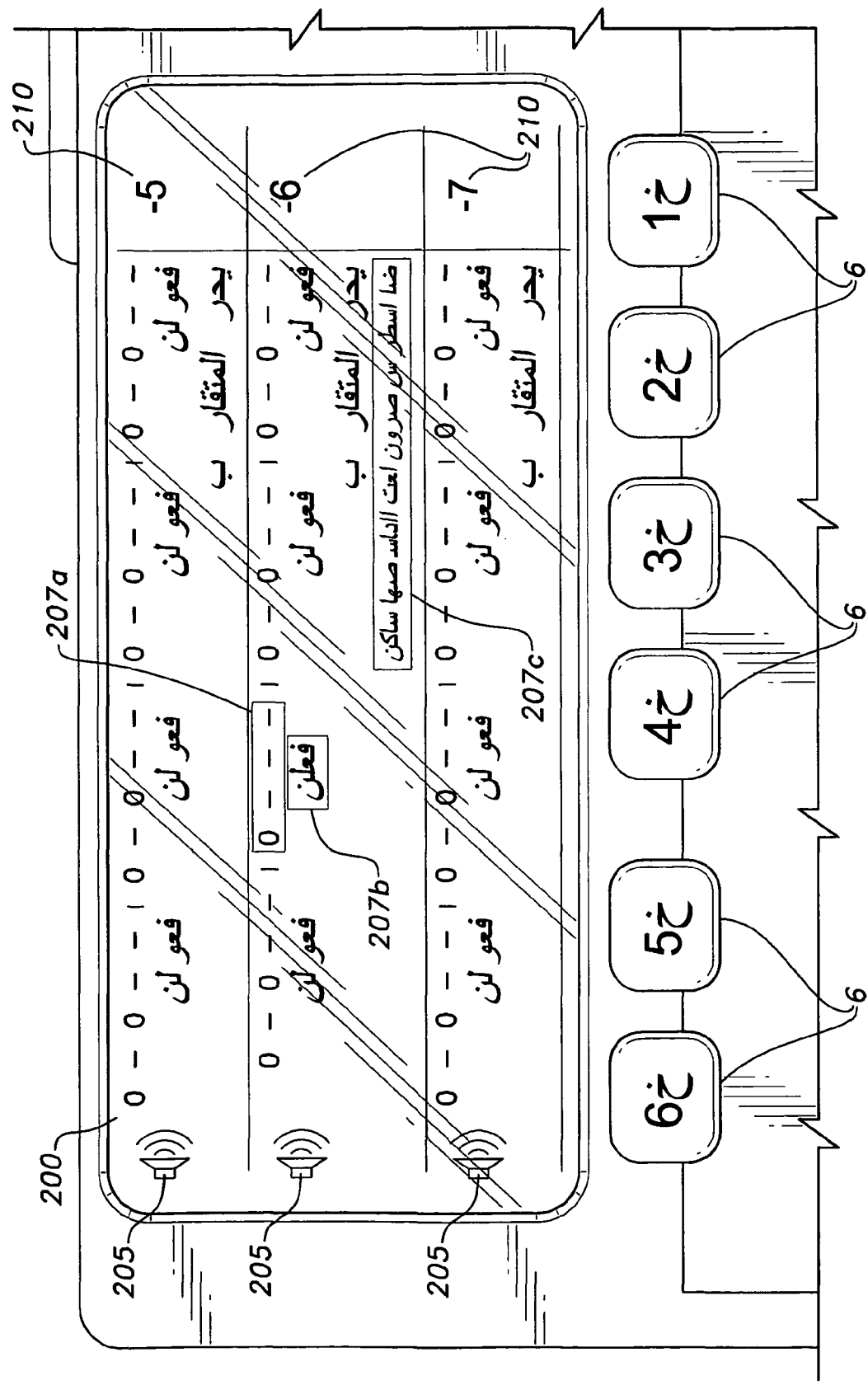
FIG. 2 is a partial front view of the device of FIG. 1, showing a typical screen display during the voice analysis mode and illustrating the Khalili transcription, the dactyls units, and poem meter, and locations for error and type of error display.

As shown in FIG. 2, the processor is programmed to analyze the incoming voice and print on screen 200 a single line of the Khalili transcription. In a second line the Tafyyel of the uttered verse is displayed. A third line displays the recognized meter of the poem. The device 10 can discover errors in the meter and highlights the errors on the display screen 200 by a color code, such as red or other suitable contrast color, shown in reverse video. The device 10 displays an explanation of the error in a fourth display line. As shown in FIG. 2, the aforementioned display sequence is repeated for each line 210 of the poem. The analysis can be saved in the memory of the device 10, transferred to another computing device, or transferred to a printer if so equipped. During the review, the user may click on the speaker icon 205 to hear the poem line-by-line and review its corresponding analysis.

The sound classes segmented by the Arabic poetry meter identification device 10 include four Arabic syllabic/sub-syllabic structures. However, other syllabic and/or sub-syllabic classes may also be segmented and classified. The segmentation and classification of the speech is then transcribed into Khalili code sequence. The Khalili sequence is then grouped into dactyl and "Tafeyyl" patterns. The sequence of dactyls is then grouped into poem meters. The device 10 can detect and identify incorrect dactyls and errors in meters. The analysis modules search a table of meter classes stored in memory and identify the stored meter most closely matching the meter of the input poetry line, and pinpoint any part of Tafeyyl that does not match with the overall class. The LCD screen 200 displays the Khalili transcription, the sequence of Tafyyel, and the matching poem meter.

An analysis technique uses Arabic language pronunciation rules to parse a given poem text into syllabic classes. Subsequently, the syllabic patterns are used to recognize specific dactyl patterns. The dactyl patterns are then used to recognize the Arabic meter of the poem. Nonconforming parts of a verse are detected, and the quality of the poem is evaluated. The Arabic poetry meter identification system and method helps a poet by suggesting words or group of words that conform to the desired dactyl pattern and meter of the poem.

In the text analysis mode, the device 10 accepts user input text from a keyboard or from an external downloaded file. The text analysis uses Arabic language pronunciation rules to parse the Arabic text into a sequence of syllabic patterns, i.e., syllabic classes. In a subsequent processing stage, the syllabic patterns are used to recognize specific dactyl patterns. In a further subsequent processing stage, the dactyl patterns are used to recognize the Arabic meter of the poem. More specifically, the syllabic patterns are transcribed into a Khalili code sequence. The Khalili sequence and the syllabic sequence are then grouped into "Tafeyyl" patterns. The sequence of dactyls are then grouped into poem meters. The device 10 analyzes the text and outputs to the screen 200 a first line comprising the Khalili transcription, a second line comprising the Tafyyel of the entered poem line, and a third line comprising a display of the class name of the poem's meter. If an error is detected, a highlight, such as error 207a, error 207b, or error 207c, is displayed in reverse video. The highlight may be, for example, a red color highlight of the text in error. An explanation of the error is displayed elsewhere on screen 200.

The display is repeated for each line of the poem, as shown in FIG. 2. The analysis can be saved in the memory of the device 10 or transferred to another computing device, printer, or other output device. The device 10 can detect and identify incorrect dactyls and errors in meter. The analysis modules search a table of meter classes and identify the stored meter most closely matching the meter of the input poetry line, and pinpoint any part of Tafeyyl that does not match with the overall class. The LCD screen 200 displays the Khalili transcription, the sequence of Tafeyyl, and the matching poem meter.

In the learning mode, the user selects the desired meter from a menu shown on display 200, and starts typing his poem. The device 10 analyzes the text, then produces and prints the Khalili transcription on screen 200. In a second line the Tafyyel of the entered poem line is displayed, and in a third line the class name of the poem's meter is displayed. If an error is discovered, it is highlighted by red color, and an explanation of the error is displayed on the screen 200. The user may then select the problem area of text highlighted by device 10. The device 10 will then produce a new window with a list of possible words or combination of words having the proper Tafyyel, from which the user can select a suitable one in accordance with the semantics of the poem. The analysis can be saved in the memory of the device 10 or transferred to another computing device, and recalled for review and for further work.

In summary of the learning mode operation, the device checks the dactyl and Tafyyel of the typed text, determines whether it matches the desired one, and suggests to the user possible words or combination of words that completes the meter of the poem verse.

Figure 3:
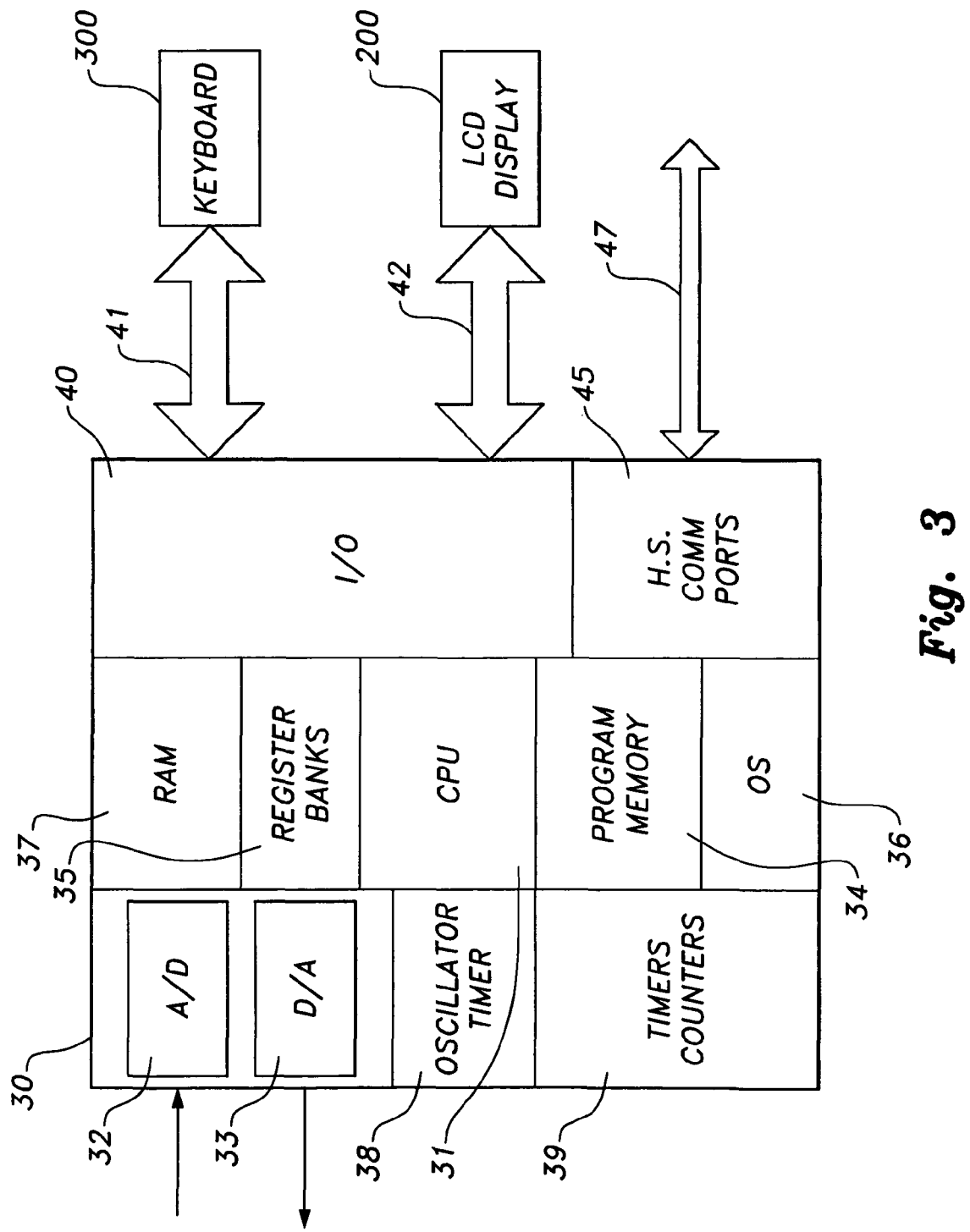
FIG. 3 is a block diagram of the main internal hardware components of an Arabic poetry meter identification system according to the present invention.

As shown in FIG. 3, the Arabic poetry meter identification system may be built around digital computing hardware 30, which may include a central processing unit (CPU) 31 or other processor. The CPU 31 fetches instructions sequentially from the program memory 34 in ROM, an EPROM, or other local memory and executes them. The program memory 34 stores the detailed computational steps of the Arabic poetry meter identification method. The results of execution can be stored temporarily in a bank or more of general purpose registers 35 and RAM 37.

The operating system 36 manages the execution of various tasks, and allocates RAM memories, board resources, and CPU time according to the execution priorities of various tasks. The RAM memory 37 stores the input voice, along with feature vectors of the input voice. Moreover, processed and transformed values of the feature vectors are stored in RAM memory 37. The RAM memory 37 may comprise a plurality of volatile and non-volatile memory sections. The non-volatile memory stores the configuration parameters, the setup parameters, the accumulated values, and the identified values. The volatile memory stores the current values, status values, and limited historical values for periodic reporting to a host computer if needed.

The execution timing of device 10 is determined by a master CPU clock oscillator 38. The timers 39 are used for setting up the sampling periods and analysis frame lengths.

The Analog-to-Digital A/D unit 32 converts the speech signal present on the analog input channels to digital words at a specified sampling rate. The analog output channel is used to send the recorded speech to other systems or to a headphone during review.

The CPU 31 is internally connected to a number of digital input/output registers 40, which interface external devices via the digital I/O channels 41 and 42. The I/O digital channel 41 is connected to the keyboard 300. The digital I/O channel 42 interfaces the control board of digital computing hardware 30 to the device display unit 200. The device may be connected to other computing devices or peripheral devices via the high speed ports 45, and the high speed communication links 47. The high speed ports 45 implement one or more communication bus and protocol, which could be a local area network, wireless communication, or a high speech serial USB port.

It will be understood that the block diagram of FIG. 3 is exemplary only, and may be embodied in a dedicated electronic device having a microprocessor, microcontroller, digital signal processor, application specific integrated circuit, or other device that combines several of the circuits onto a single chip programmed solely to carry out the method steps described herein, or may be embodied in a general purpose computer having the appropriate peripherals attached thereto and software stored on a computer readable media that can be loaded into main memory and executed by the processing unit 31 to carry out the steps of the method described herein.

Recognition of the acoustic units in the Arabic poetry requires similar techniques as those used in modern speech recognition. While in speech recognition, the aim is to identify the speech words and sentences, the Arabic poetry meter identification method identifies the syllabic patterns of the poem speech to produce speech-to-Khalili transcription of the poetry. Moreover, the method carried out by device 10 identifies the meters, i.e., Awzan forms of the Abyate.

Although the procedure in this embodiment uses mathematical modeling techniques similar to those used in related art phoneme recognition automatic speech recognition (ASR) systems, the method steps have models that directly recognize specific syllabic patterns structures in Arabic poems. Moreover, the method steps provide recognition models that identify the meter of a spoken Arabic poem. Accordingly, the method is substantially more efficient and more accurate in directly recognizing the meters of Arabic poems.

The Arabic poetry meter identification method receives a vocal or audio rendition of the poem and processes it by a series of computer programming algorithms to identify the Arabic poem meter, detect poetry metrical errors committed by the users, and evaluate the accuracy of the meter. The Arabic poetry meter identification method applies mathematical modeling techniques, which are similar, in a broad sense, to those used in speech recognition in order to identify the meter of the spoken Arabic poems.

While in speech recognition the aim is to recognize the uttered words and sentences and to produce the corresponding text, the aim of the disclosed invention is to identify specific syllabic and rhyme patterns in the spoken poems, and to produce the Khalyli-coded transcription of these poetry meters. Moreover, in large-vocabulary speaker-independent speech recognition, a system is trained to recognize the mathematical models of the phonemes sounds of the language, and then to use a language model to match the phoneme sequence to a sequence of words. On the other hand, the Arabic poetry meter identification system and method has mathematical template models and procedures to recognize specific classes of syllabic structures.

More specifically, in the disclosed embodiment, the Arabic poetry meter identification method classifies only four acoustic syllabic/subsyllabic patterns, then applies the Arabic poem meter rules to identify the dactyl structures, and then the overall meter of the entire poem, as well as the type of ending rhyme of the poem. A finite state model is applied to each meter. The model includes a statistical model for the frequency of syllables and their bigram and trigram sequences. A language model requires development of Finite State Grammar (FSG) models for the meters. In a subsequent stage, the FSG is modified to detect possible mismatches and/or identify these errors.

Figure 7:
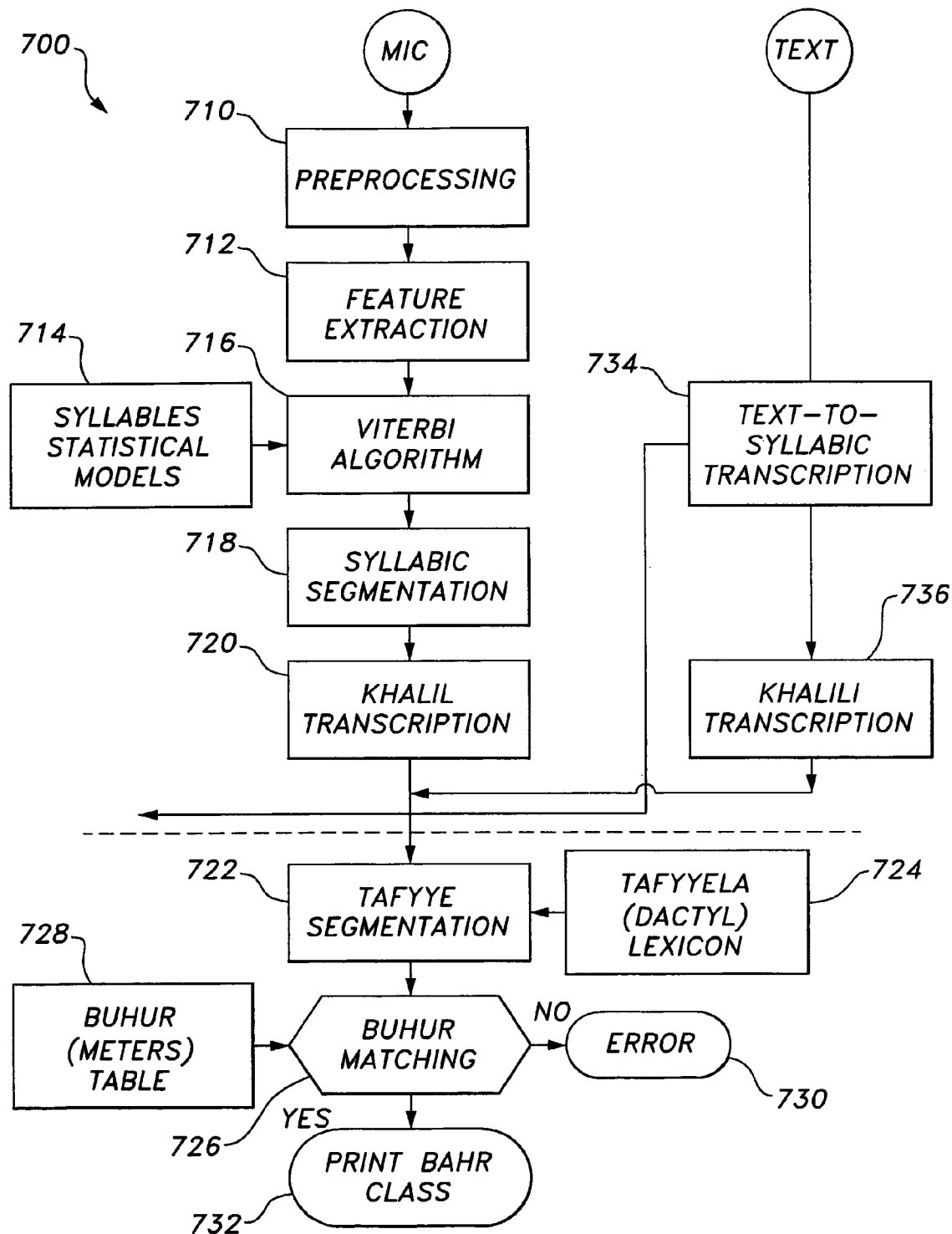
FIG. 7 shows a flowchart showing the main processing steps of the voice analysis and text analysis modes in an Arabic poetry meter identification system and method according to the present invention.

In the first mode of operation, as shown in the flowchart 700 of FIG. 7, the Arabic poetry meter identification method receives speech from a microphone or from some other source of recorded speech. In a preprocessing step 710, the analog speech is first low-pass filtered and band limited to about 7.5 kHz. The speech is then sampled at 16,000 samples per second. In a feature extraction step 712, the speech samples are grouped in windows of 25.6 msec (about four hundred ten samples), having consecutive frames that overlap by ten milliseconds. Each window is pre-emphasized and is multiplied by a Hamming window. The basic feature vector uses the Mel Frequency Cepstrum Coefficients MFCC. The MFCCs are obtained by taking the Discrete Cosine Transform (DCT) of the log power spectrum, $S_k$, $k=1, 2, \ldots, K$ from Mel spaced filter banks. We can then calculate the MFCC's, $x(n)$ as:

$$x(n) = \frac{1}{L}\sum_{k=1}^{k=K}(\log S_k)\cos\left[n(k-0.5)\frac{\pi}{K}\right],$$

$$n = 1, 2, \ldots, L$$

Thirteen cepstrum coefficients are calculated. The base feature vector, $x_t(k)$ $1 \leq k \leq 12$ uses 12 coefficients.

The basic feature vector is usually normalized by subtracting the mean over the sentence utterance. $x(0)$ represents the log mel spectrum energy, and is used to derive other feature parameters. The basic feature vector is highly localized. To account for the temporal properties, three other derived vectors are constructed from the basic MFCC coefficients: a 40-ms and 80-ms differenced MFCCs (24 parameters), a 12-coefficient second order differenced MFCCs, and a 3-dimensional vector representing the normalized power (log energy), differenced power, and second-order differenced power. In an alternative design, between three and seven consecutive basic features are used as input to a neural network, as it will be explained in the Arabic syllables models.

The sound units considered here are three syllabic units, and the unvoweled Arabic consonants are referred to as CV, CVV, CVC, and C, where C is a consonant and V is a short vowel. These acoustic units are modeled by Hidden Markov Models (HMM) of five states, seven states, seven states, and three states, respectively. A large acoustic database of the Arabic poems is used to form the parameters of these models. The model parameters include the transition probabilities and the emission probabilities of the models.

The HMM-based technique comprises recognizing speech by estimating the likelihood of each phoneme at contiguous, small frames of the speech signal. Words in the target vocabulary are modeled into a sequence of phonemes, and then a search procedure is used to find, among the words in the vocabulary list, the phoneme sequence that best matches the sequence of phonemes of the spoken word.

Each phoneme is modeled as a sequence of HMM states. In standard HMM-based systems, the likelihoods (also known as the emission probabilities) of a certain frame observation being produced by a state is estimated using traditional Gaussian mixture models or by an artificial neural network (ANN).

In speech recognition the technique is usually based on modeling of the phoneme sounds. However, in the Arabic poetry meter identification method, recognition of the syllabic patterns and the recognition of the rhythm created by the patterns in the poem are focused on.

Figure 4:
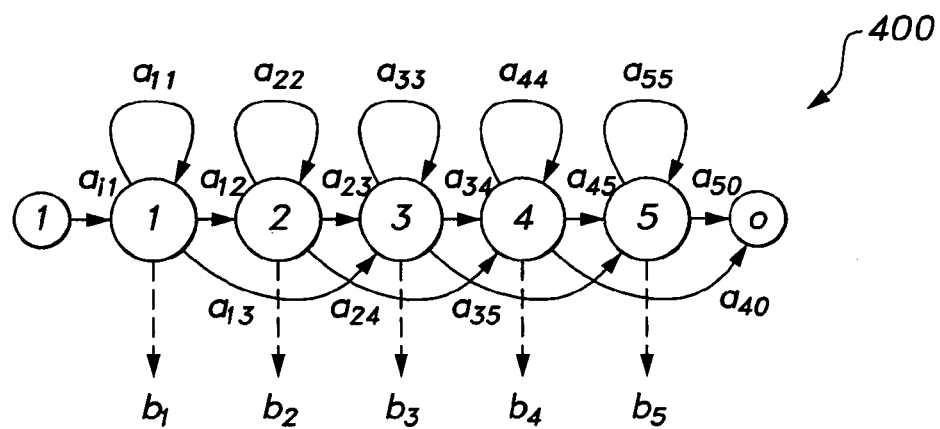
FIG. 4 shows a diagram of a 5-state HMM model structure for CV syllable analysis in an Arabic poetry meter identification system according to the present invention.
Figure 5:
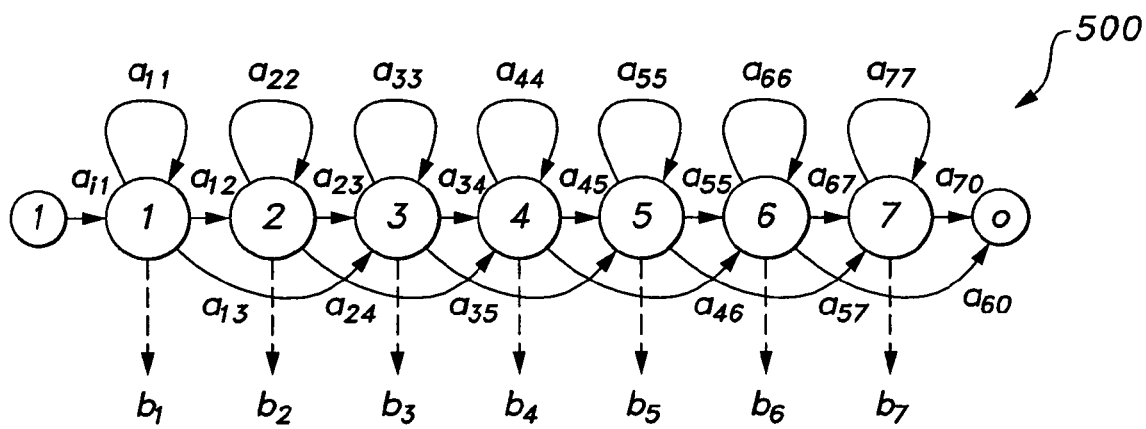
FIG. 5 shows a diagram of a 7-state HMM model structure for CVV and CVC syllable analysis in an Arabic poetry meter identification system according to the present invention.
Figure 6:
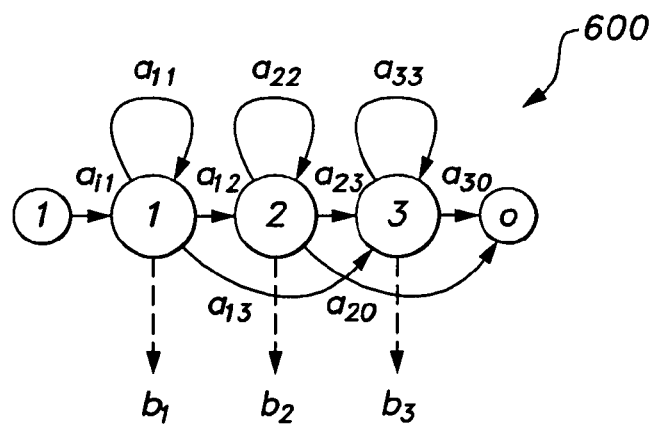
FIG. 6 shows a diagram of a 3-state HMM model structure for unvoweled Arabic consonant analysis in an Arabic poetry meter identification system according to the present invention.

The device 10 contains templates and statistical models 714 representing short Arabic syllables of the form CV, CVV, CVC, and the subsyllable C, where C is a consonant and V is a short vowel. The CV models are represented by the Hidden Markov Model (HMM) models 400, 500, and 600 for the CV, CVV & CVC, and C, as shown in FIGS. 4, 5, and 6, respectively. An HMM model, $\lambda$, is completely specified by the following parameters: the number of states, N; the state transition probabilities, A, $a_{ij}=P(s_{t+1}=j|s_t=i)$, are the transition probability from state I to state j, where $s_t$ is the state at time t; the observation symbol probability, bj, $b_j(x_t)=P(x_t|s_t=j)$, where $x_t$ is the observation at time t; and the initial state probabilities, $\Pi$, $\pi_i=P(s_1=i)$.

The HMM model parameters can be computed using a corpus of spoken Arabic poems and the HMM model building tools, which are available free from Cambridge University. The numerical values of these model parameters can statistically vary, depending on the size of the available corpus of spoken poems, the feature vectors, and the sampling rate. The parameters of the HMM models are stored in tables coded in the device 10. The structure comprises three emitting states and two non-emitting states for the unvoweled consonants, as shown in model 600 of FIG. 6. Five emitting states and two non-emitting states are allocated to the CV syllables, as shown in model 500 of FIG. 5. Seven emitting states and two non-emitting states are allocated to the CVV or the CVC syllables, as shown in model 400 of FIG. 4. Other HMM structures or combinations of HMM and Neural Networks may also be used for modeling the syllables.

FIG. 7 illustrates the procedure steps for the voice analysis mode of the Arabic poetry meter identification system. The voice may be entered from a microphone. The speech passes through a preprocessing step, where it is low pass filtered, band limited, and level adjusted. The speech is then sampled and grouped into analysis windows, and the features for each corresponding frame are obtained as explained above. The spoken poem is divided into verses.

In steps 714 and 716, syllabic statistical models are provided as input to a Viterbi algorithm to compute the likelihood of syllables at contiguous frames of the speech signal. At step 718, a syllabic segmentation procedure finds the syllable sequence that best matches the sequence of the spoken poem. At step 720, the syllabic segmentations are used to generate a Khalili transcription. The CV syllable is replaced by "___". The long vowel and the CVV syllables are replaced by "O___", and the unvoweled consonants are represented by "O".

At steps 722 and 724, the Khalili transcription is grouped into a sequence of dactyls (Taffyye Segmentation) from a table (Dactyl Lexicon). The dactyl sequences are searched to find the best sequence of dactyls that matches the sequence of syllables or the Khalili code. In step 728, the sequence of dactyls is grouped into meters. In step 726, the meter-grouped dactyl sequence is searched to find the meter that most closely matches the sequence of dactyls. The list of dactyls contains the correct dactyls, which may be printed at step 732, and possible faulty ones at step 730. It should be understood that, in lieu of audio, step 734 may be utilized to provide a syllabic transcription from text input (TEXT) to the device 10. Step 736 produces a Khalili transcription from the text to syllabic transcription.

The matching process can then detect if the highest scored pattern contains illegal dactyls. The meter table may also contain correct and incorrect meters. An exemplary displayed analysis is shown in FIG. 2. The first line of lines 210 displays a single line of the poem. The second line of lines 210 displays the Khalili transcription. The third line of lines 210 displays the dactyl transcription. If an error is detected, the wrong dactyl 207a is highlighted, and an explanatory message 207c is displayed in the display 200. The explanatory message may also be included in a voice message.

As shown in FIG. 7, the text analysis mode allows the user to enter a verse of a poem. The poem may also be previously saved in the device memory, or obtained from another computing device. A text to syllable procedure unit 734 converts the text into corresponding syllables using an algorithm known by persons having ordinary skill in the art. The syllables are classified into a sequence of the four aforementioned syllable classes. The syllabic segmentations are used to generate the Khalili transcription. The Khalili transcription is grouped into a sequence of dactyls from a table. A fourth search algorithm is used to find the best sequence of dactyls that matches the sequence of syllables or the Khalili code. The sequence of dactyls is again grouped into meters. A fifth search algorithm is used to find the meter that best matches the sequence of dactyls. The list of dactyls contains the correct dactyls and possible faulty ones. The matching process can then detect if the highest scored pattern contains illegal dactyls. The meter table may also contain correct and incorrect meters.

In the learning mode, shown in FIG. 8, the user enters the text of a line of poem, or a part of the line. The text to syllabic transcription takes place at step 810, the Khalil transcription being performed at step 812. The Taffye segmentation occurs at step 814. A meters table 818 is used as input to a Buhur matching process that is performed at step 816. If a match occurs, the Bahr class is printed/displayed at step 820. If there is no metric (Buhur) matching, an error is registered at step 826. The error registration triggers a dactyl suggestion procedure at step 822. The dactyl suggestion procedure utilizes Tafyyelat tables and database 824 as input to formulate the dactyl suggestion. The suggested dactyl is fed-back to the text to syllabic transcription process at step 810.

As shown in FIG. 2, the text will appear on the first line of lines 210 within display screen 200. The device 10 analyzes the text and produces and prints on screen 200 the Khalili transcription on a second of display lines 210. A third line of display lines 210 shows the Tafyyel of the entered poem line.

A fourth line of display lines 210 shows the class name of the meter of the poem. If an error is discovered, the error item is highlighted by an indicator 207a, 206b, or 207c. The indicator may be an exemplary red color, or the like. An explanation of the error is presented in the display 200. The user may then select the problem area of his text. The device 10 will then produce a new window with a list of possible words or combination of words having the proper Tafyyel, from which the user can select a suitable one in accordance with the semantics of the poem. The analysis can be saved in the memory 34 of the device, or transferred to another computing device and recalled for review and for further work.

It is to be understood that the present invention is not limited to the embodiment described above, but encompasses any and all embodiments within the scope of the following claims.

We claim:

1. A poetry meter identification system, comprising:
   a data input device for entering poetry, wherein said data input device comprises an audio input for inputting and receiving spoken audio voice input from a user;
   a data output device for outputting a coded transcription of the at least one meter form of the poetry; and
   a processor having software executable thereon, the software including:
   means for recording the spoken audio voice input;
   means for segmenting the spoken audio voice input into a sequence of basic sound signal classes;
   means for automatically identifying at least one meter form of the poetry entry;
   means for distinguishing between proper spoken poetic meter and improper spoken poetic meter of the poetry;
   means for identifying poetry meter errors; and
   means for identifying ending rhyme pattern errors.

2. The poetry meter identification system according to claim 1, wherein the software further comprises:
   means for extracting feature vectors from the spoken poetry, the feature vectors representing frame sequences of speech;
   means for accessing a list of models of syllabic and sub-syllabic patterns; and
   means for identifying spoken language syllabic and sub-syllabic patterns from the list of models of syllabic and sub-syllabic patterns and selecting a best sequence of spoken language syllabic patterns matching the spoken poetry.

3. The poetry meter identification system according to claim 2, wherein the spoken language of the poetry is Arabic.

4. The poetry meter identification system according to claim 3, wherein the software further comprises means for parsing and coding the recognized sequence of Arabic syllabic patterns into Khalili transcription.

5. The poetry meter identification system according to claim 3, wherein the software further comprises means for computing feature vector sequences identifying syllabic and sub-syllabic patterns having unvoweled Arabic consonants, Arabic consonants followed by short vowels, Arabic consonants followed by long vowels, and consonant-short vowel-consonant clusters.

6. The poetry meter identification system according to claim 4, wherein the software further comprises:
   means for parsing Arabic poem text into Arabic syllables;
   means for identifying the Arabic syllables by common syllabic patterns; and
   means for encoding the resulting Arabic syllabic pattern sequence into Khalili transcription.

7. The poetry meter identification system according to claim 6, wherein the stored list of models of syllabic and sub-syllabic patterns further comprises tables of Arabic word groups corresponding to standard Arabic poem dactyls.

8. The poetry meter identification system according to claim 6, wherein the software further comprises means for parsing the Khalili sequence into a sequence of dactyls from the list of dactyls, the list of dactyls containing the permissible dactyl patterns and a possible set of wrong dactyl patterns.

9. The poetry meter identification system according to claim 8, wherein the data output device comprises a display screen for indicating the coded transcription of the at least one meter form of the poetry.

10. The poetry meter identification system according to claim 9, wherein the software further comprises means for displaying:
    a first display row showing a Khalili transcription of a corresponding line of the spoken poem;
    a second display row showing a dactyl sequence of the Khalili transcription; and
    a third display row showing a meter of the spoken poem.

11. The poetry meter identification system according to claim 10, wherein said means for displaying further comprises means for displaying a fourth display row showing the possible set of wrong dactyl patterns.

12. The poetry meter identification system according to claim 10, wherein the means for displaying further comprises means for displaying a line of text associated with a respective display row, the line of text describing the type of ending rhyme of the poem and whether the type of ending rhyme is consistent with the rhyme structure of the poem.

13. An electronic poetry meter identification method, comprising the steps of:
   accepting entry of a poem into an electronic device, wherein said electronic device includes an audio input for inputting and receiving spoken audio voice input from a user;
   recording the spoken audio voice input;
   segmenting the spoken audio voice input into a sequence of basic sound signal classes;
   electronically identifying at least one meter form of the poem entry automatically;
   electronically providing a coded transcription of the at least one meter form of the poem;
   electronically distinguishing between proper spoken poetic meter and improper poetic meter of the poem;
   electronically identifying poem meter errors; and
   electronically identifying ending rhyme pattern errors.

14. The electronic poetry meter identification method according to claim 13, further comprising the steps of electronically:
   extracting feature vectors from the spoken poetry, the feature vectors representing frame sequences of speech;
   using the feature vector sequences to identify spoken language syllabic and sub-syllabic patterns from a stored list of models of syllabic and sub-syllabic patterns; and
   selecting a best sequence of spoken language syllabic patterns matching the spoken poetry.

15. The electronic poetry meter identification method according to claim 14, wherein the spoken language of the poetry is Arabic.

16. The electronic poetry meter identification method according to claim 15, further comprising the steps of parsing and coding recognized sequences of Arabic syllabic patterns into Khalili transcription.

17. The electronic poetry meter identification method according to claim 15, further comprising the step of providing feature vector sequences identifying syllabic and sub-syllabic patterns having unvoweled Arabic consonants, Arabic consonants followed by short vowels, Arabic consonants followed by long vowels, and consonant-short vowel-consonant clusters.

18. The electronic poetry meter identification method according to claim 16, further comprising the steps of
   parsing Arabic poem text into Arabic syllables;
   identifying the Arabic syllables by their common syllabic patterns; and
   encoding the resulting Arabic syllabic pattern sequence into Khalili transcription.

19. The electronic poetry meter identification method according to claim 17, further comprising the steps of:
   parsing the Khalili sequence into a sequence of dactyls from the list of dactyls, the list of dactyls containing the permissible dactyl patterns and a possible set of wrong dactyl patterns;
   displaying in a first display row a Khalili transcription of a corresponding line of the spoken poem;
   displaying in a second display row a dactyl sequence of the Khalili transcription;
   displaying in a third display row the meter of the spoken poem; and
   displaying in a fourth display row the possible set of wrong dactyl patterns.

20. A computer software product that includes a non-transitory computer storage medium readable by a processor, the non-transitory computer storage medium having stored thereon a set of instructions for performing poetry meter identification, the instructions comprising:
   (a) a first set of instructions which, when loaded into main memory and executed by the processor, causes the processor to accept entry of a poem from a user in the form of spoken audio voice input;
   (b) a second set of instructions which, when loaded into main memory and executed by the processor, causes the processor to record the spoken audio voice input;
   (c) a third set of instructions which, when loaded into main memory and executed by the processor, causes the processor to segment the spoken audio voice input into a sequence of basic sound signal classes;
   (d) a fourth set of instructions which, when loaded into main memory and executed by the processor, causes the processor to automatically identify at least one meter form of the poem entry;
   (e) a fifth set of instructions which, when loaded into main memory and executed by the processor, causes the processor to provide the user a coded transcription of the at least one meter form of the poem;
   (f) a sixth set of instructions which, when loaded into main memory and executed by the processor, causes the processor to distinguish between proper spoken poetic meter and improper poetic meter of the poem;
   (g) a seventh set of instructions which, when loaded into main memory and executed by the processor, causes the processor to notify the user of poem meter errors; and
   (h) an eighth set of instructions which, when loaded into main memory and executed by the processor, causes the processor to notify the user of ending rhyme pattern errors.

* * * * *